(No Model.)
E. THOMSON.
ELECTRIC MOTOR.
No. 438,656.  Patented Oct. 21, 1890.
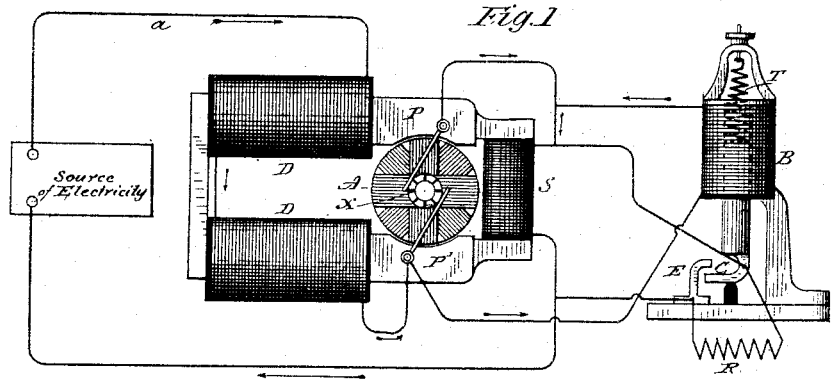
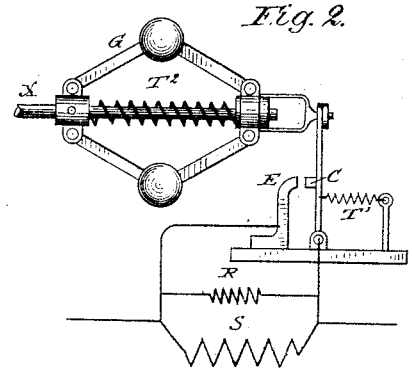
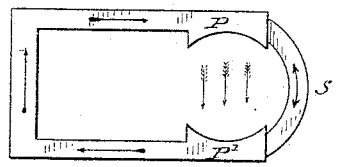
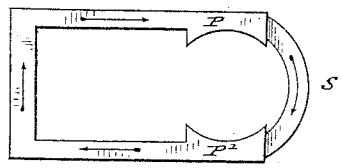
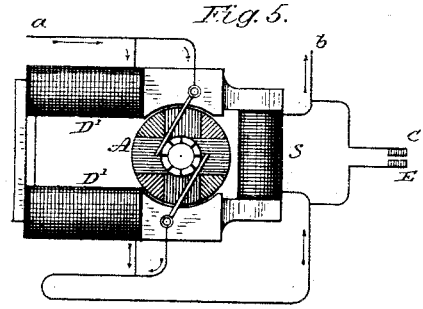
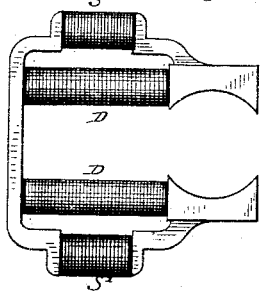
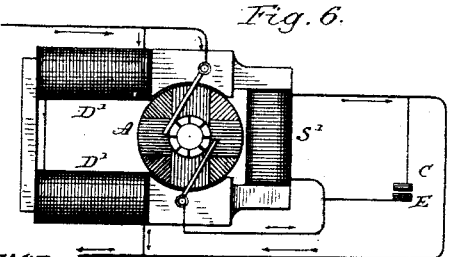
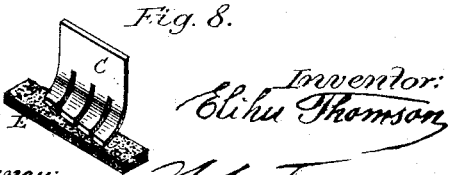

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

ELECTRIC MOTOR.

SPECIFICATION forming part of Letters Patent No. 438,656, dated October 21, 1890.

Application filed January 15, 1885. Serial No. 152,951. (No model.)

*To all whom it may concern:*

Be it known that I, ELIHU THOMSON, a citizen of the United States, and a resident of Lynn, in the county of Essex and State of Massachusetts, have invented certain new and useful Improvements in Electric Motors, of which the following is a specification.

My invention relates to a means for automatically governing or controlling the speed of electric motors, and is designed to provide a means whereby the speed of the motor shall be prevented from abnormally increasing upon a diminution in the load.

My invention relates particularly to an organization wherein there is applied to the field-magnet of the motor a short-circuiting bar or bars of iron permanently joined to the poles, but under normal conditions prevented from becoming magnetic by current in a coil wound upon the bar or bars, which current by its magnetizing action opposes the inductive action of the field itself, thus leaving the connecting-bar unpolarized. Upon excessive speed the current upon said bar is removed or diminished, so that the lines of force from the field-magnets may close themselves through the bar, thus reducing the power of the motor-armature by reducing the influence of the field-magnet upon it. The flow of current from any source in the depolarizing-coil is governed by any device responsive to changes in the speed of rotation of the armature, as, for instance, by an electro-magnet responsive to changes in the counter electro-motive force developed in the armature, or by a speed governor or indicator of any kind—such as the well-known centrifugal governor—mechanically responsive to changes in the speed of rotation. Such devices are made to act through a circuit-controller switch, a variable resistance, or any other agency whereby the flow of current on a circuit may be changed, so as to change the flow of current in the coil, cutting down the flow on an increase of speed, and increasing the flow on a decrease of speed.

In the accompanying drawings, Figure 1 is a side elevation of a motor having one form of my invention applied thereto. Fig. 2 illustrates a modification in which the flow of current in the coil is controlled by a centrifugal governor. Figs. 3 and 4 are diagrams illustrative of the magnetic condition. Figs. 5 and 6 illustrate diagrammatically modifications in the manner of connecting the field-magnet coils, the armature, and the demagnetizing-coil to one another and to the general circuit. Fig. 7 shows a modified way of applying the short-circuiting magnetic bar. Fig. 8 illustrates a modification of the switch-contacts designed to give the effect of variable resistance.

Referring to Fig. 1, A indicates the usual rotating armature of an electric motor of any kind, and P P' pole-pieces for the field-magnet, between which pole-pieces the armature turns.

The field-magnet is magnetized either permanently or by coils D D, traversed by an electric current from any source. These coils, if connected to the same circuit as the armature, may be arranged in multiple arc with the armature or in series therewith.

Coils of wire upon a bar S, to be presently described, are connected with any source, but preferably with the same circuit as the armature and coils D D, and in any desired manner—that is, in multiple arc with either the armature or the coils D D, or with both, or in series with either or both. The coils on S are of high or low resistance, as may be desirable or required by the particular arrangement employed. Connecting the poles P P' by a sort of magnetic bridge is a bar of iron wound with wire and indicated at S. Such bar would short-circuit the magnetism were it not that a current is maintained in the coils S of just sufficient strength to depolarize the iron which it surrounds and effectually oppose the inductive action from P to P' through it. Hence while said current is maintained in S the bar in its axis is inert as a carrier of magnetism. This is illustrated in Fig. 3, where the opposed arrows at S show the opposition of the tendencies of the magnetizing forces applied to S, which thus leaves the magnetism of the poles P P' free to act upon the armature-space, as indicated. In Fig. 4 the current is supposed to have been cut off from the coil at S, Fig. 1, when at once a short circuit of magnetism of the field takes place at S, Fig. 4, almost annihilating the effect of the field upon the armature-space. To render these actions dependent upon the speed of running, I may utilize the variations of counter electro-motive force on the armature in the manner shown in Fig. 1.

B indicates an electro-magnet whose coil is preferably of high resistance, and is placed in a derived circuit around the armature, as indicated. As thus arranged, the electro-magnet B will, through the forcing of current into its branch, acquire an increased power when there is increased counter electro-motive force developed in the armature through an increase in its speed of rotation. The movable core or armature of the electro-magnet is thereby raised, carrying with it a contact C of a circuit controller or switch, so as to make connection with the contact at E. The contacts C E are in a shunt around the coil at S, and when closed upon increased speed of rotation of the armature effectually divert current from coil at S, which loses its power to restrain the field-poles P P' from short-circuiting through the bridge-bar. This weakens the field and lowers the force of rotation of the armature. In practice, if the motor is not overloaded, an intermittent closure and opening of the contacts may be expected. The opening of the contacts restores current to S, and the field polarity of P P' is thereby regained in consequence of the restored effect of S in preventing short-circuiting of magnetism. It is advisable to use a permanent resistance R of short length, but of several times the resistance of S, as a shunt around the contacts to lessen or remove spark.

It may sometimes be desirable to control the flow of current in coils S by a variable or adjustable artificial resistance in place of simple contacts C E, the adjustment being made in such way as to decrease the resistance when the speed of the motor rises. A simple device of this kind is a set of variable contacts, each as indicated in Fig. 8, and consisting, essentially, of a split spring whose teeth make contact in succession with an opposite contact of carbon, the resistance being lessened as the number of teeth in contact increases. Other devices well known in the art might be used instead.

Instead of using the differences of counter electro-motive force in the armature as the controlling agency, I may employ centrifugal action through a centrifugal governor of any desired kind, such as indicated at G, Fig. 2, said governor being driven by the motor-shaft X or responding to its speed changes. Connected with said governor so as to be moved by changes in its speed of rotation is the arm or support for one of the contacts C, arranged in such way as to close the contact with E and diminish or stop the current in the coils at S upon an increased speed of the motor-armature.

The speed of the motor is adjusted by adjusting the strength of the supporting-spring T, Fig. 1, or of the governor-spring $T^2$, Fig. 2, so as to determine the speed at which the circuit-controller shall act.

In Fig. 1 the coils D D, armature A, and coils at S are, as shown, all connected into circuit in series with one another.

In Fig. 5 coils D D and armature A are connected in derived circuit, and coil S is arranged in series with them.

In Fig. 6 there is still another arrangement. The current here branches through coils D D as one branch and through armature-coils A and S in series as the other branch.

The arrangement, Figs. 1 and 2, 5 and 6, are especially adapted to lines upon which the current is maintained constant, while Figs. 5 and 6 are least adapted for use where there are constant variations in the difference of potential between terminals or positive and negative wires of supply-main.

In Fig. 7 a modification is shown in which bars S S' short-circuit each leg of the field-magnet separately. This is one of many possible changes of disposition of my short-circuiting iron bridge for the field-magnets.

What I claim as my invention is—

1. The combination, with the short-circuiting magnetic bar and its coil, of a current-controller therefor and a governing-magnet in a derived circuit around the armature.

2. The combination, with the short-circuiting magnetic bar and its coil, of a current-controller therefor and devices responsive to changes in the speed of rotation of the armature for governing the action of said current-controller.

Signed at Lynn, in the county of Essex and State of Massachusetts, this 3d day of January, A. D. 1885.

ELIHU THOMSON.

Witnesses:
  E. J. RICHARDS,
  E. W. RICE, Jr.